United States Patent
Yasui

(10) Patent No.: US 12,175,766 B2
(45) Date of Patent: Dec. 24, 2024

(54) INFORMATION PROCESSING APPARATUS, VEHICLE, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 335 days.

(21) Appl. No.: 17/695,354

(22) Filed: Mar. 15, 2022

(65) Prior Publication Data

US 2022/0309797 A1 Sep. 29, 2022

(30) Foreign Application Priority Data

Mar. 26, 2021 (JP) .................. 2021-053601

(51) Int. Cl.
*G06N 5/04* (2023.01)
*B60W 30/18* (2012.01)
*G06N 3/045* (2023.01)
*G06V 20/58* (2022.01)

(52) U.S. Cl.
CPC ....... *G06V 20/58* (2022.01); *B60W 30/18109* (2013.01); *G06N 3/045* (2023.01); *G06N 5/04* (2013.01); *B60W 2420/403* (2013.01)

(58) Field of Classification Search
CPC ........ G06V 20/58; G06V 10/82; G06V 20/56; B60W 30/18109; B60W 2420/403; B60W 50/0097; B60W 60/001; B60W 60/00; G06N 3/045; G06N 5/04; G06N 3/044; G06N 3/08; G06F 16/2474
See application file for complete search history.

(56) References Cited

U.S. PATENT DOCUMENTS

| | | | |
|---|---|---|---|
| 10,814,881 B2 * | 10/2020 | Liu | G06N 3/044 |
| 11,865,721 B2 | 1/2024 | Matsuoka et al. | |
| 2019/0225216 A1 | 7/2019 | Yasui | |
| 2020/0114926 A1 | 4/2020 | Liu et al. | |
| 2022/0016770 A1 | 1/2022 | Matsuoka et al. | |
| 2022/0147851 A1 * | 5/2022 | Yoshimura | G06N 20/00 |

FOREIGN PATENT DOCUMENTS

| | | | |
|---|---|---|---|
| JP | 2009-262702 A | | 11/2009 |
| JP | 2019-127098 A | | 8/2019 |
| JP | 2020-124760 A | | 8/2020 |
| WO | 2020081611 A1 | | 4/2020 |
| WO | WO-2020145085 A1 * | | 7/2020 |

OTHER PUBLICATIONS

Japanese Office Action for Japanese Patent Application No. 2021-053601 mailed Oct. 7, 2024.

* cited by examiner

*Primary Examiner* — Said M Elnoubi
(74) *Attorney, Agent, or Firm* — Thomas | Horstemeyer, LLP

(57) ABSTRACT

An information processing apparatus includes a processing unit configured to execute an inference operation in an execution cycle. The inference operation is executed by inputting input data including time series data to a neural network. An interval of acquiring constituting data of the time series data to be input in a single time of the inference operation is longer than the execution cycle.

16 Claims, 5 Drawing Sheets

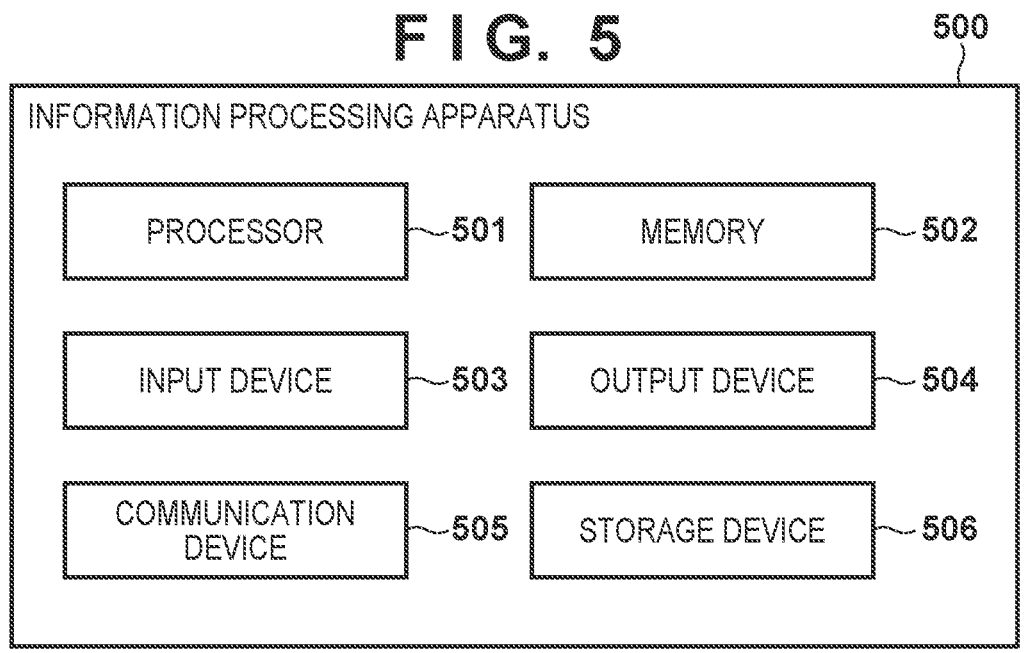
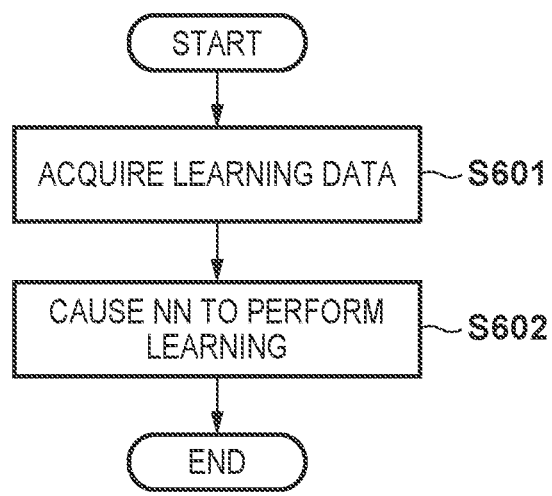

INFORMATION PROCESSING APPARATUS, VEHICLE, AND STORAGE MEDIUM

CROSS-REFERENCE TO RELATED APPLICATION(S)

This application claims priority to and the benefit of Japanese Patent Application No. 2021-053601 filed on Mar. 26, 2021, the entire disclosure of which is incorporated herein by reference.

BACKGROUND OF THE INVENTION

Field of the Invention

The present disclosure relates to an information processing apparatus, a vehicle, and a storage medium.

Description of the Related Art

In automated driving, a technique of action planning using a model generated by machine learning is known. Japanese Patent Laid-Open No. 2019-127098 describes calculation of a curvature using a plurality of pieces of time series data of estimated coordinate values calculated in a period from the past to the present in automated driving control processing.

SUMMARY OF THE INVENTION

In a case of periodically executing an inference operation using time series data as an input, if the interval of acquiring the time series data is equal to the execution cycle of the inference operation, the accuracy of the inference operation may be low. One aspect of the present disclosure provides a technique of improving the accuracy of the periodically executed inference operation.

According to an embodiment, an information processing apparatus includes a processing unit configured to execute an inference operation in an execution cycle. The inference operation is executed by inputting input data including time series data to a neural network. An interval of acquiring constituting data of the time series data to be input in a single time of the inference operation is longer than the execution cycle.

BRIEF DESCRIPTION OF THE DRAWINGS

FIG. 5 is a block diagram illustrating an example of a configuration of an information processing apparatus according to the first embodiment;

FIG. 6 is a flowchart illustrating an example of an operation of the information processing apparatus according to the first embodiment;

DESCRIPTION OF THE EMBODIMENTS

Figure 1:
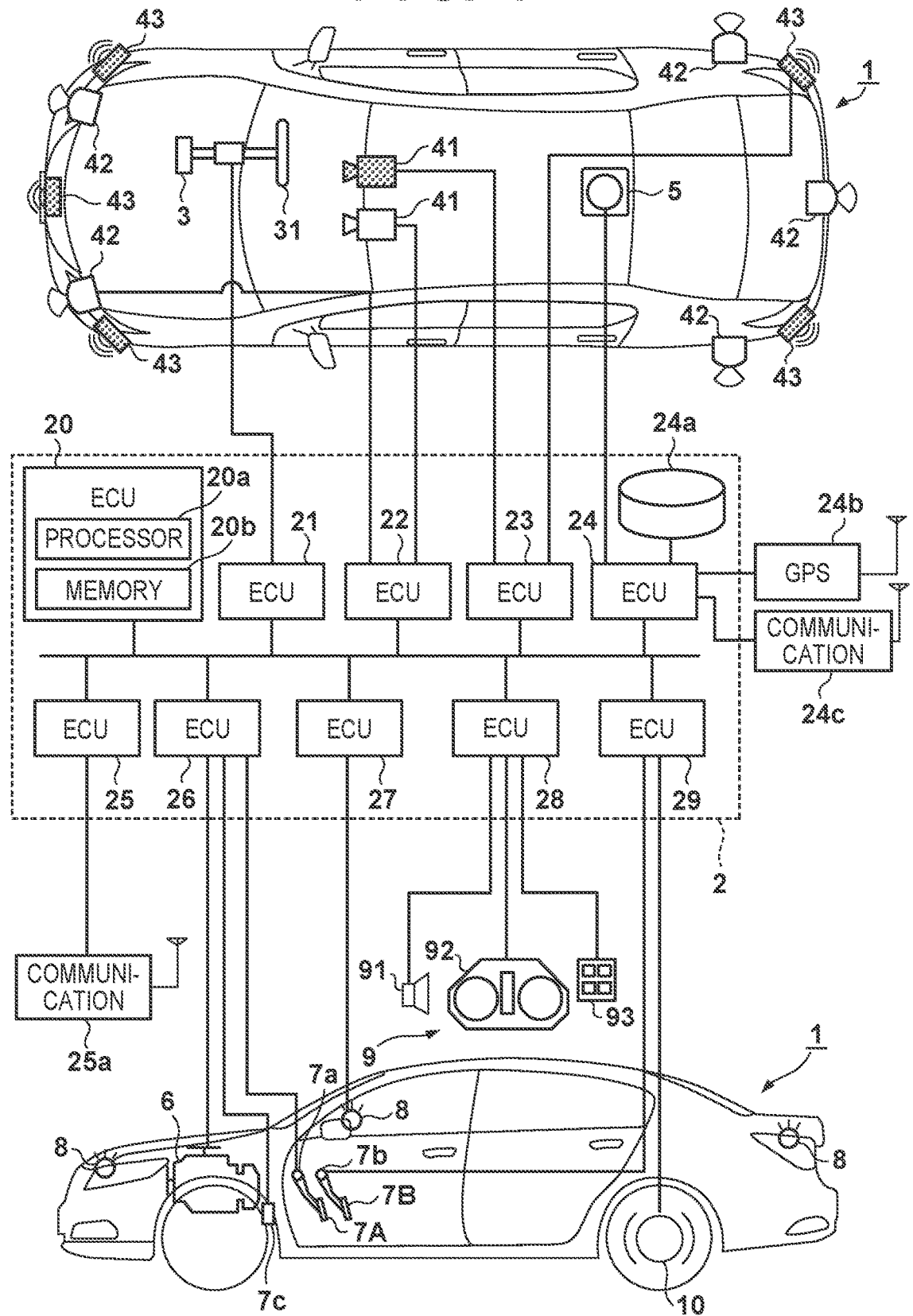
FIG. 1 is a block diagram illustrating an example of a configuration of a vehicle according to a first embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram of a vehicle 1 according to a first embodiment of the present invention. In FIG. 1, the vehicle 1 is schematically illustrated in a plan view and a side view. The vehicle 1 is, for example, a sedan-type four-wheeled passenger vehicle. The vehicle 1 may be such a four-wheeled vehicle, a two-wheeled vehicle, or another type of vehicle.

The vehicle 1 includes a vehicle control device 2 (hereinafter, simply referred to as a control device 2) that controls the vehicle 1. The control device 2 includes a plurality of ECUs 20 to 29 communicably connected by an in-vehicle network. Each ECU includes a processor represented by a central processing unit (CPU), a memory such as a semiconductor memory, an interface with an external device, and the like. Each ECU may be referred to as an information processing apparatus. The memory stores a program executed by the processor, data used for processing by the processor, and the like. Each ECU may include a plurality of processors, memories, interfaces, and the like. For example, the ECU 20 includes a processor 20a and a memory 20b. The ECU 20 executes processing by the processor 20a executing a command included in a program stored in the memory 20b. Alternatively, the ECU 20 may include a dedicated integrated circuit such as an application-specific integrated circuit (ASIC) for the ECU 20 to execute processing. The same applies to other ECUs.

Hereinafter, functions and the like assigned to the ECUs 20 to 29 will be described. Note that the number of ECUs and the functions assigned to the ECUs can be designed as appropriate and can be further subdivided than in the present embodiment or integrated.

The ECU 20 executes a control related to automated traveling of the vehicle 1. In automated driving, at least one of steering and acceleration/deceleration of the vehicle 1 is automatically controlled. The automated traveling by the ECU 20 may include automated traveling that does not require a driver to perform a traveling operation (which may also be referred to as automated driving) and automated traveling for assisting the driver in performing a traveling operation (which may also be referred to as driving assistance).

The ECU 21 controls an electric power steering device 3. The electric power steering device 3 includes a mechanism that steers front wheels according to a driving operation (steering operation) given to a steering wheel 31 by a driver. The electric power steering device 3 includes a motor that produces driving force for assisting the steering operation and automatically steering the front wheels, a sensor that detects a steering angle, and the like. In a case where the driving state of the vehicle 1 is the automated driving, the ECU 21 controls the electric power steering device 3 in an automated manner in response to an instruction from the ECU 20, and controls the traveling direction of the vehicle 1.

The ECUs 22 and 23 control detection units 41 to 43 that detect the surrounding situation of the vehicle, and perform information processing on the detection result. The detection unit 41 is a camera (hereinafter, also referred to as a camera 41) that captures an image of a scene ahead of the vehicle 1 and is attached to the vehicle interior side of the windshield in front of the roof of the vehicle 1 in the present embodiment. By analyzing the image captured by the camera 41, a contour of a target object or a division line (white line or the like) of a lane on a road can be extracted.

The detection unit 42 is a light detection and ranging (lidar) (hereinafter, also referred to as a lidar 42) that detects a target object in the surrounding of the vehicle 1 and measures the distance to a target object, for example. In the present embodiment, five lidars 42 are provided, one at each corner portion of the front portion of the vehicle 1, one at the center of the rear portion of the vehicle 1, and one at each side of the rear portion of the vehicle 1. The detection unit 43 is a millimeter-wave radar (hereinafter, also referred to as a radar 43) that detects a target object in the surrounding of the vehicle 1 and measures the distance to the target object, for example. In the present embodiment, five radars 43 are provided, one at the center of the front portion of the vehicle 1, one at each corner portion of the front portion of the vehicle 1, and one at each corner portion of the rear portion of the vehicle 1.

The ECU 22 controls one of the cameras 41 and each one of the lidars 42, and performs information processing on the detection result. The ECU 23 controls the other one of the cameras 41 and each one of the radars 43, and performs information processing on the detection result. Providing two sets of devices for detecting the surrounding situation of the vehicle 1 improves the reliability of the detection result. Providing different types of detection units such as a camera, a lidar, and a radar enables analyzing the surrounding environment of the vehicle 1 in multiple ways.

The ECU 24 controls a gyro sensor 5, a global positioning system (GPS) sensor 24b, and a communication device 24c, and performs information processing on a detection result or a communication result. The gyro sensor 5 detects a rotational motion of the vehicle 1. The course of the vehicle 1 can be determined based on the detection result of the gyro sensor 5, the wheel speed, and the like. The GPS sensor 24b detects the current location of the vehicle 1. The communication device 24c performs wireless communication with a server that provides map information and traffic information to acquire pieces of these information. The ECU 24 can access a map information database 24a constructed in a memory, and the ECU 24 performs searching for a route from the current position to a destination and the like. The ECU 24, the map information database 24a, and the GPS sensor 24b constitute a navigation device.

The ECU 25 includes a communication device 25a for vehicle-to-vehicle communication. The communication device 25a performs wireless communication with other vehicles in the surrounding to exchange information with the vehicles.

The ECU 26 controls a power plant 6. The power plant 6 is a mechanism that outputs the driving force for rotating driving wheels of the vehicle 1 and includes, for example, an engine and a transmission. For example, the ECU 26 controls the output of the engine according to a driving operation (accelerator operation or acceleration operation) performed by the driver and detected by an operation detection sensor 7a provided on an accelerator pedal 7A, and switches the gear ratio of the transmission based on information such as a vehicle speed detected by a vehicle speed sensor 7c and the like. In a case where the driving state of the vehicle 1 is the automated driving, the ECU 26 controls the power plant 6 in an automated manner in response to an instruction from the ECU 20, and controls the acceleration/deceleration of the vehicle 1.

The ECU 27 controls lighting devices (headlights, taillights, and the like) including direction indicators 8 (blinkers). In the example in FIG. 1, the direction indicator 8 is provided on the front portion, door mirrors, and the rear portion of the vehicle 1.

The ECU 28 controls an input/output device 9. The input/output device 9 outputs information to the driver and receives an input of information from the driver. A voice output device 91 notifies the driver of information by a sound. A display device 92 notifies the driver of information by displaying an image. The display device 92 is disposed, for example, in front of a driver's seat, and constitutes an instrument panel, for example. Note that, although notifying by a sound and displaying are exemplified, information may also be notified by vibration or light. Information may be notified by a combination of those among sound, displaying, vibration, and light. Furthermore, the combination or the form of notification may be changed according to the level (for example, the degree of urgency) of information to be given. An input device 93 is a group of switches disposed at a place where the driver can operate them and is used to give an instruction to the vehicle 1. The input device 93 may also include a voice input device.

The ECU 29 controls a brake device 10 and a parking brake (not illustrated). The brake device 10 is, for example, a disc brake device, is provided on each wheel of the vehicle 1, and applies resistance against the rotation of the wheel to decelerate or stop the vehicle 1. The ECU 29 controls operating of the brake device 10 in response to a driving operation (brake operation) performed by the driver and detected by an operation detection sensor 7b provided on a brake pedal 7B, for example. In a case where the driving state of the vehicle 1 is the automated driving, the ECU 29 controls the brake device 10 in an automated manner in response to an instruction from the ECU 20, and controls the deceleration and stopping of the vehicle 1. The brake device 10 and the parking brake can also operate to keep the vehicle 1 in a stopped state. In a case where the transmission of the power plant 6 includes a parking lock mechanism, the parking lock mechanism can also operate to keep the vehicle 1 in a stopped state.

Figure 2:
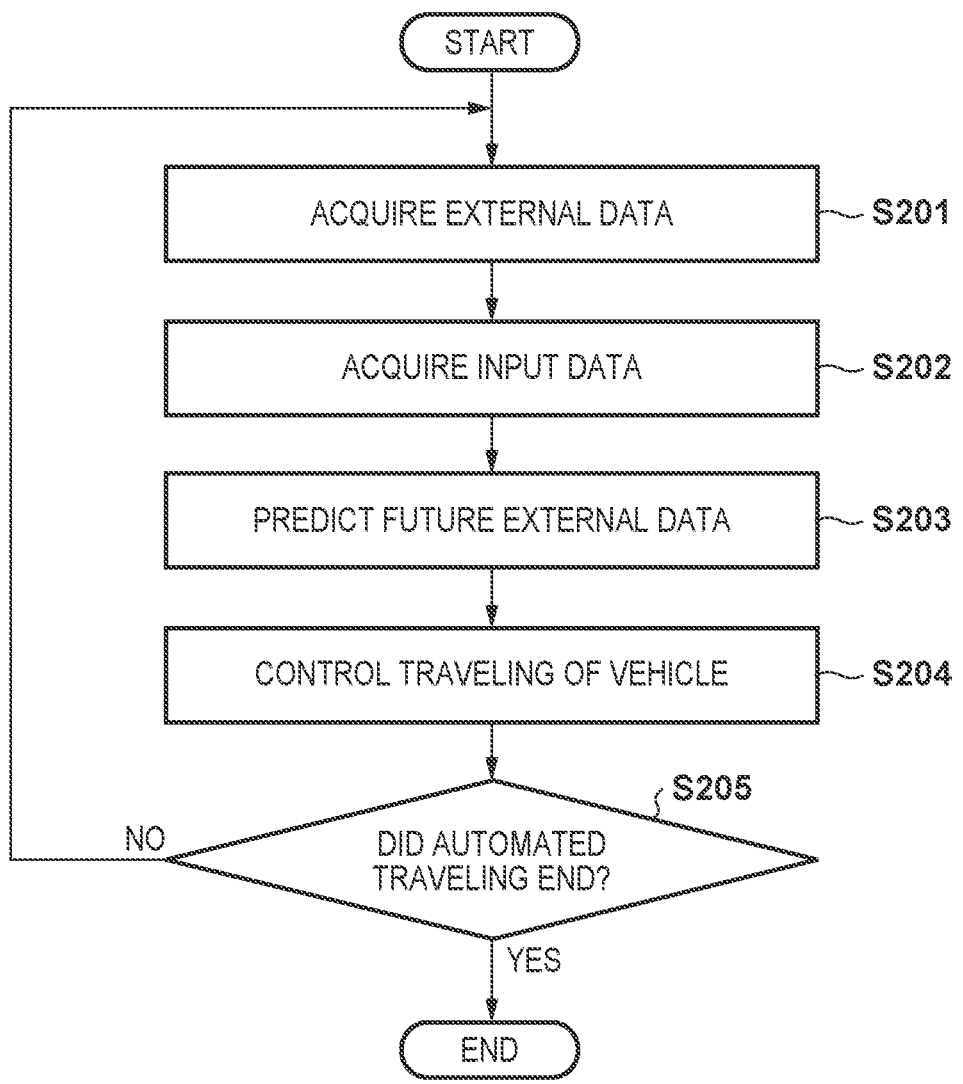
FIG. 2 is a flowchart illustrating an example of an operation of an electronic control unit (ECU) according to the first embodiment.

An example of an operation by the ECU 20 for performing automated traveling control will be described with reference to FIG. 2. Each step of the operation may be performed, for example, by the processor 20a executing a command included in a program stored in the memory 20b. Alternatively, at least a step of the operation in FIG. 2 may be performed by a dedicated integrated circuit such as an application specific integrated circuit (ASIC) and field programmable gate array (FPGA). The operation in FIG. 2 starts when the vehicle 1 starts the automated traveling control. In FIG. 2, description on an operation not used for the operation of the present embodiment is omitted. An existing operation may be performed for the operation whose description is omitted.

In step S201, the ECU 20 acquires external data related to the external of the vehicle 1 and stores the acquired external data in a storage unit (for example, the memory 20b). The external data includes, for example, data related to a traffic participant (a vehicle, a pedestrian, a bicycle, and the like) in the surrounding of the vehicle 1, and a static object (a building, a road, a sign, and the like). The external data is acquired using, for example, the above-described detection units 41 to 43. For example, the external data may be an image of the surrounding of the vehicle 1 captured by the camera 41. As will be described later, the external data is repeatedly acquired. Thus, the external data is stored in the memory 20b as time series data. That is, each piece of external data is constituting data of the time series data. When storing external data acquired at a new time, the ECU 20 may delete past external data that is no longer used from the storage unit.

In step S202, the ECU 20 acquires input data to be used in an inference operation in step 203. The input data may include, for example, vehicle data at the time point when step 202 is performed and the time series data of the external data. The vehicle data may include, for example, the speed, the acceleration, and the like of the vehicle 1. What kind of external data is to be acquired will be described later.

In step S203, the ECU 20 makes a prediction of the external data at a future time point using the input data acquired in step S202. Specifically, the ECU 20 executes an inference operation by inputting the input data to a neural network that has already performed learning. The result of the inference operation (output result) is the result of predicting external data.

Figure 3:
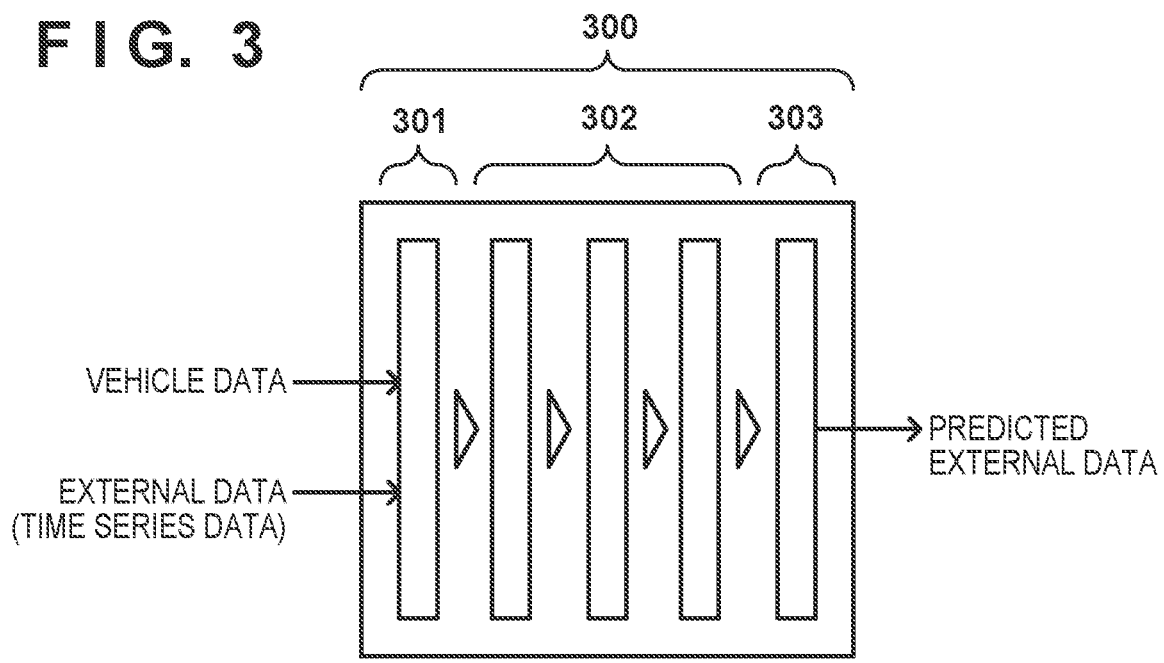
FIG. 3 is a schematic diagram illustrating an example of a neural network according to the first embodiment.

A specific example of the neural network used for the inference operation in step S203 will be described with reference to FIG. 3. The neural network 300 includes an input layer 301, an intermediate layer 302, and an output layer 303. In the example in FIG. 3, the number of intermediate layers 302 is 3, but the number of intermediate layers 302 is not limited to 3. The neural network 300 may be a deep neural network having a large number (for example, 5 or more) of intermediate layers 302. The neural network 300 performs learning before the start of the operation in FIG. 2 and is stored in the storage unit (for example, the memory 20b) of the vehicle 1. The method for learning will be described later. The vehicle data and the external data of time series are input to the neural network 300.

The input layer 301 may have an individual node for each pixel value of the external data. Alternatively, convolution processing may be performed on the external data in the input layer 301. That is, the neural network 300 may be a convolutional neural network. Furthermore, the neural network 300 may be a three-dimensional convolutional neural network. In the input layer 301 of the three-dimensional convolutional neural network, a plurality of pieces of external data acquired at different times are convolved.

In step S204, the ECU 20 controls traveling of the vehicle 1 based on the result of the inference operation (specifically, the predicted external data). Since this step may be performed using an existing technique, a detailed description is omitted. For example, the ECU 20 generates an action plan for the vehicle 1 based on the predicted external data, and controls actuators of the vehicle 1 according to the action plan.

In step S205, the ECU 20 determines whether to end the automated traveling control. If the ECU 20 determines that the automated traveling control is to be ended ("YES" in step S205), the ECU 20 ends the processing, and otherwise ("NO" in step S205), the ECU 20 returns the processing to S201. For example, it may be determined that the automated traveling control is to be ended according to an instruction from the driver or in response to the driver taking over the driving.

As described above, the ECU 20 repeatedly executes the operations in steps S201 to S204. In the present embodiment, the ECU 20 executes steps S201 to S204 periodically, so as the interval of executing the operation of the same step to be constant. Hereinafter, the interval of execution is referred to as an execution cycle, and its length is denoted as P. That is, the ECU 20 acquires the external data in step S201 and executes the inference operation in step S203 in the execution cycle P.

Figure 4:
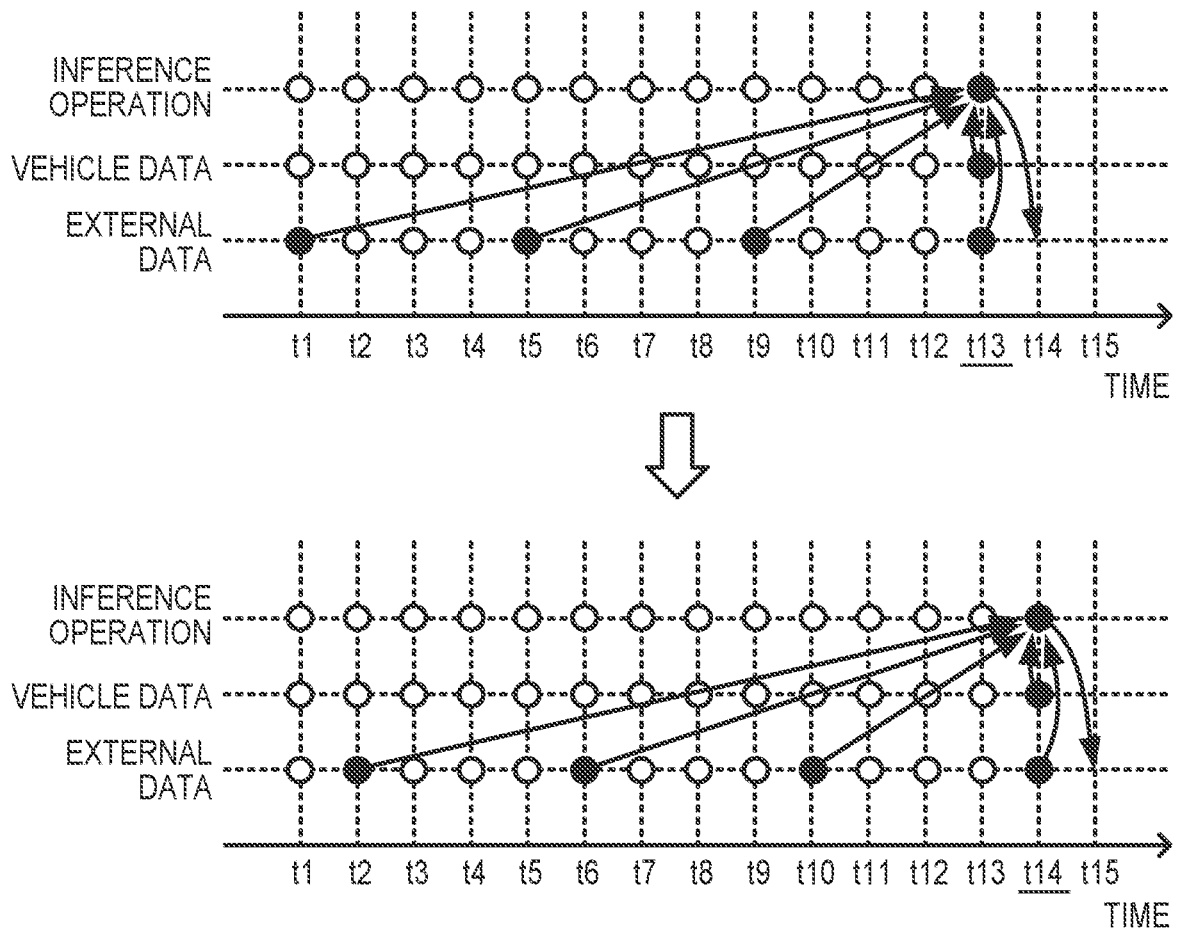
FIG. 4 is a schematic diagram illustrating an example of input data according to the first embodiment.

With reference to FIG. 4, the input data used for the inference operation will be specifically described. In FIG. 4, circles (white circles and a black circle) horizontally lined on the right of "inference operation" indicate inference operations executed at the respective times. The black circle indicates the inference operation executed at a time of interest. Circles (white circles and a black circle) horizontally lined on the right of "vehicle data" indicate the pieces of vehicle data acquired at the respective times. The black circle indicates the vehicle data used for the inference operation executed at the time of interest. Circles (white circles and black circles) horizontally lined on the right of "external data" indicate the pieces of external data acquired at the respective times. The black circles indicate the external data used for the inference operation executed at the time of interest.

The upper figure in FIG. 4 describes the inference operation executed at time t13. The ECU 20 executes the inference operation at each of times t1 to t12 before time t13. Thus, for each of times t2 to t13, the time interval from the immediately previous time (for example, t2-t1) is equal to the execution cycle P described above. At time t13, the ECU 20 inputs the vehicle data acquired at time t13 and the pieces of external data acquired at times t1, t5, t9, and t13 to the neural network 300, thereby executing the inference operation for predicting the external data at time t14. In the inference operation at time t13, among the pieces of external data constituting the time series data, the pieces of external data acquired at times other than times t1, t5, t9, and t13 are not used. As described above, in the present embodiment, the interval of acquiring the external data constituting the time series data that is input in a single time of inference operation is longer than the execution cycle P. Hereinafter, the interval of acquiring the external data constituting the time series data that is input in a single time of inference operation is referred to as an acquisition interval I. In the example in FIG. 4, the acquisition interval I is four times the execution cycle P.

A technical effect obtained by making the acquisition interval I longer than the execution cycle P in this manner will be described. It is preferable that the execution cycle P of the inference operation is short, which enables quick response to the change in the outside. Since the execution cycle P cannot be shorter than the time required for the inference operation, the execution cycle P is about 50 to 150 milliseconds in a certain environment, for example. In the following description, the execution cycle P is assumed to be 100 milliseconds. It is assumed that a pedestrian is walking at a speed of 4 km/h in the surrounding of the vehicle 1. In this case, the pedestrian moves about 0.1 m in 100 milliseconds. When the acquisition interval I is equal to the execution cycle P, the change in environmental data occurring between adjacent times is hard to be distinguished due to observation noise, so the accuracy of the inference operation is low. In contrast, in the present embodiment, taking the acquisition interval I longer than the execution cycle P magnifies the change in environmental data between adjacent times, whereby the accuracy of the inference operation is improved.

In the example in FIG. 4, the acquisition interval I is four times the execution cycle P. Alternatively, the acquisition interval I may be a two or more integral multiple of the execution cycle P. Setting the ratio of the acquisition interval I to the execution cycle P to an integral multiple makes the calculation easy, since there is no need of adjustment among the cycle of acquiring the external data and the cycle of executing the inference operation. The number of multiplication is appropriately determined according to the relationship between the execution cycle P and the input data. The acquisition interval I does not need to be an integral multiple of the execution cycle P. For example, when acquisition of the external data and execution of the inference operation are performed asynchronously, the acquisition interval I may not take a value of an integral multiple of the execution cycle P.

The lower figure in FIG. 4 describes the inference operation executed at time t14. At time t14, the ECU 20 inputs the vehicle data acquired at time t14 and the pieces of external data acquired at times t2, t6, t10, and t14 to the neural network 300, thereby executing the inference operation for predicting the external data at time t15. In the inference operation at time t14, among pieces of the external data constituting the time series data, the pieces of external data acquired at times other than times t2, t6, t10, and t14 are not used. As described above, the acquisition interval I is longer than the execution cycle P also in the inference operation executed at time t14.

The external data used in the inference operation at time 14 includes the external data acquired at a new time t14 as compared with the external data used in the inference operation at time 13. As described above, every time the inference operation is executed, the ECU 20 updates the time series data constituted by the external data and included in the input data so as to include the external data acquired at a new time. Thus, a prediction can be performed taking the latest external situation into consideration. Furthermore, in this updating, the ECU 20 updates the time series data constituted by the external data and included in the input data so as each pieces of the external data to be the external data acquired at the respective time advanced by the execution cycle P. Specifically, times t2, t6, t10, and t14 at which the pieces of the external data to be used in the inference operation at time 14 are acquired are respectively the times advanced by the execution cycle P from times t1, t5, t9, and t13 at which the pieces of the external data to be used in the inference operation at time 13 are acquired. Accordingly, the variation in inference accuracy for every execution of the inference operation can be suppressed.

An example of the configuration of an information processing apparatus 500 for causing the neural network 300 to perform learning will be described with reference to a block diagram in FIG. 5. The information processing apparatus 500 is achieved with an information processing apparatus such as a personal computer and a workstation, for example. The information processing apparatus 500 may be achieved with a single apparatus or a plurality of apparatuses connected to each other via a network.

The information processing apparatus 500 includes components illustrated in FIG. 5. A processor 501 controls the overall operation of the information processing apparatus 500. The processor 501 is achieved with, for example, a CPU, a combination of a CPU and a graphics processing unit (GPU), or the like. A memory 502 stores a program, temporary data, and the like used for an operation of the information processing apparatus 500. The memory 502 is achieved with, for example, a read only memory (ROM) and a random access memory (RAM).

The input device 503 is used by a user of the information processing apparatus 500 to give an input to the information processing apparatus 500, and is achieved with, for example, a mouse, a keyboard, or the like. The output device 504 is used by the user of the information processing apparatus 500 to confirm an output from the information processing apparatus 500, and is achieved with, for example, an output device such as a display or an acoustic device such as a speaker. The communication device 505 provides a function to the information processing apparatus 500 to communicate with another device, and is achieved with, for example, a network card or the like. Communication with another device may be a wired communication or a wireless communication. The storage device 506 is used to store data used for processing by the information processing apparatus 500, and is achieved with, for example, a hard disk drive (HDD) or a solid state drive (SSD).

An example of an operation by the information processing apparatus 500 for performing a learning operation will be described with reference to FIG. 6. Each step of the operation may be performed, for example, by the processor 501 executing a command included in a program stored in the memory 502. Alternatively, at least a step of the operation in FIG. 6 may be performed by a dedicated integrated circuit such as an ASIC or an FPGA. The operation in FIG. 6 may start by an instruction from the user to start learning.

The information processing apparatus 500 acquires learning data in step S601. The storage device 506 of the information processing apparatus 500 previously stores the past time series data of the external data related to the external of the vehicle 1, and the past time series data of the vehicle data of the vehicle 1. The information processing apparatus 500 selects and acquires learning data from the data stored in the storage device 506.

In step S602, the information processing apparatus 500 causes the neural network 300 to perform learning using the learning data. Since an existing algorithm may be used as a specific algorithm for a method for learning, a detailed description will be omitted.

Figure 7:
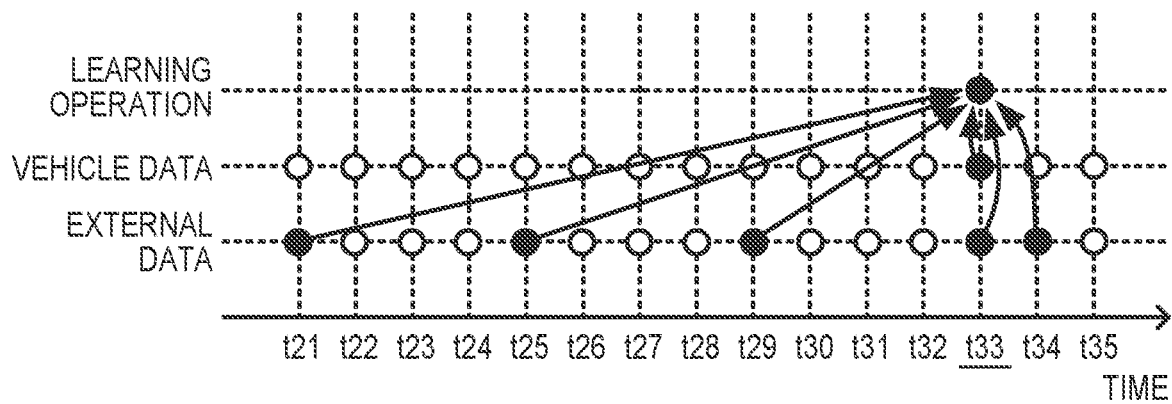
FIG. 7 is a schematic diagram illustrating an example of learning data according to the first embodiment.

The learning data used for a learning operation will be specifically described with reference to FIG. 7. In FIG. 7, a black circle on the right of "learning operation" indicates a reference time for performing the learning operation. Circles (white circles and a black circle) horizontally lined on the right of "vehicle data" indicate the pieces of vehicle data acquired at the respective times. The black circle indicates the vehicle data used for the learning operation. Circles (white circles and black circles) horizontally lined on the right of "external data" indicate the pieces of external data acquired at the respective times. The black circles indicate the external data used for the learning operation. Times t21 to t35 are past times earlier than the time point at which the learning operation is performed.

In the example in FIG. 7, time t33 is a reference time for the learning operation. In the learning operation, the ECU 20 inputs the vehicle data acquired at time t33 and the pieces of external data acquired at times t21, t25, t29, and t33 to the neural network 300, thereby executing the inference operation for predicting the external data at time t34. The ECU 20 compares the result of inference with the external data at time t35 to cause the neural network 300 to perform learning. The information processing apparatus 500 performs the learning operation for various reference times. The interval of acquiring the external data to be input to the neural network 300 in the learning operation is longer than the execution cycle P of the inference operation performed using the neural network 300. Accordingly, the neural network 300 used in the operation in FIG. 2 can perform learning with high accuracy.

Second Embodiment

Figure 8:
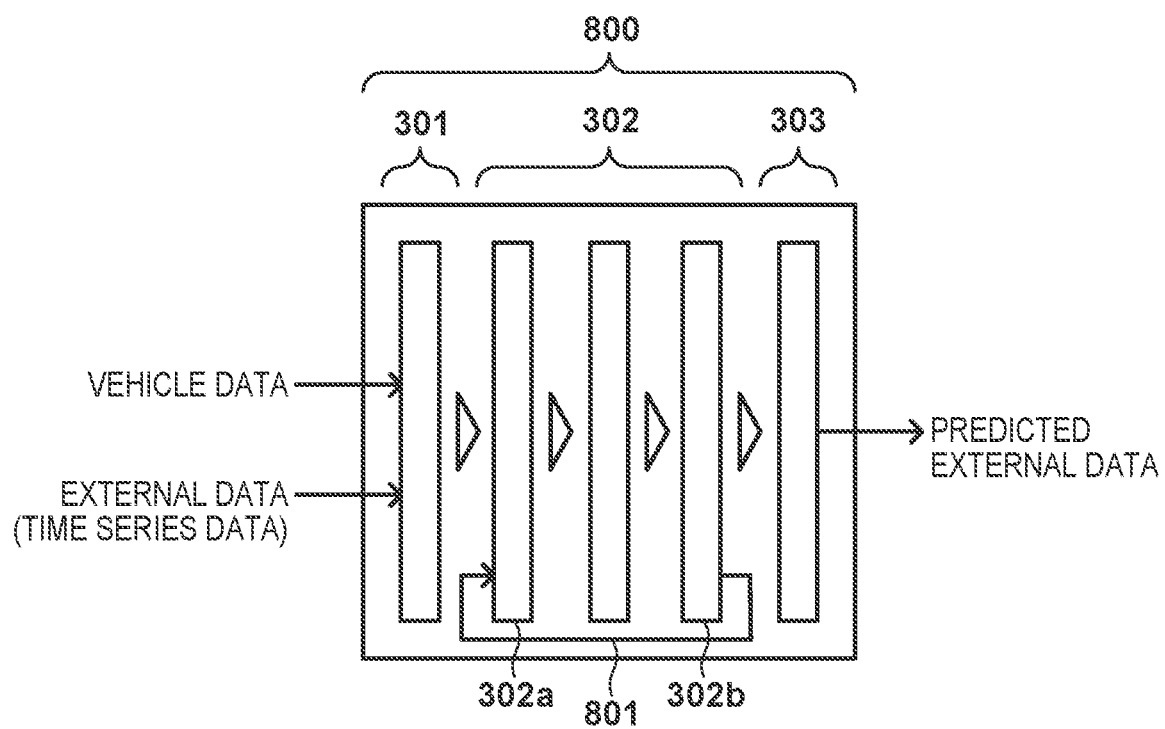
FIG. 8 is a schematic diagram illustrating an example of a neural network according to a second embodiment.

A second embodiment of the present invention will be described with reference to FIG. 8. The second embodiment differs from the first embodiment in that a neural network 800 is used instead of the neural network 300, but may be similar to the first embodiment in other configurations.

The neural network 800 is different from the neural network 300 in that a feedback path 801 is provided in addition to an input layer 301, an intermediate layer 302, and an output layer 303. The neural network 800 may be a recurrent neural network. In the neural network 800, the output of the intermediate layer 302b is fed back to the intermediate layer 302a. As described in the first embodiment, the ECU 20 periodically performs the inference operation. The ECU 20 feeds back, to the intermediate layer 302a, an output of the intermediate layer 302b at a time earlier by a two or more integral multiple of the execution cycle P. For example, while the inference operation is performed at time t13, the ECU 20 feeds back, to the intermediate layer 302a, an output of the intermediate layer 302b in the inference operation at time t9 (earlier by four times the execution cycle P).

Exemplary Modifications

In the embodiment described above, the neural network 300 performs supervised learning, and the inference operation is performed using the neural network 300. Alternatively, the neural network 300 may be used for unsupervised learning or reinforcement learning. For example, the ECU 20 of the vehicle 1 may execute an inference operation for performing an action plan of the vehicle 1 using a model obtained by performing reinforcement learning. In this case, the neural network 300 may be used for a deep Q-network (DQN). Furthermore, the embodiments described above have been described in a context of the automated traveling control of the vehicle. However, the embodiments described above are also applicable in other contexts in which the inference operation is periodically performed.

Summary of Embodiments

Item 1. An information processing apparatus (20) comprising
a processing unit (20a) configured to execute an inference operation in an execution cycle (P), wherein
the inference operation is executed by inputting input data including time series data to a neural network (300, 800), and
an interval (I) of acquiring constituting data of the time series data to be input in a single time of the inference operation is longer than the execution cycle.

According to this item, the change in the time series data can be easily recognized, so that the accuracy of the inference operation is improved.

Item 2. The information processing apparatus according to Item 1, wherein an interval of acquiring constituting data of the time series data to be input in a single time of the inference operation is a two or more integral multiple of the execution cycle.

According to this item, the acquisition cycle of the constituting data and the execution cycle of the inference operation can be synchronized, so that calculation is easy.

Item 3. The information processing apparatus according to Item 1 or 2, wherein the processing unit is configured to update, for each execution of the inference operation, the time series data included in the input data to include constituting data acquired at a new time.

According to this item, the inference can be performed taking the latest situation into consideration.

Item 4. The information processing apparatus according to Item 1 or 2, wherein the processing unit is configured to update, for each execution of the inference operation, the time series data included in the input data, wherein each constituting data of the updated time series data is constituting data acquired at a time advanced by the execution cycle.

According to this item, the variation in inference accuracy for every execution of the inference operation can be suppressed.

Item 5. The information processing apparatus according to any of Items 1-4, wherein
the neural network is a recurrent neural network (800), and
the processing unit is configured to feed back, to a second intermediate layer of the recurrent neural network, an output of a first intermediate layer at a time earlier by a two or more integral multiple of the execution cycle.

According to this item, the accuracy of the inference operation is further improved.

Item 6. The information processing apparatus according to any of Items 1-4, wherein the neural network is a three-dimensional convolutional neural network.

According to this item, the accuracy of the inference operation is further improved.

Item 7. A vehicle (1) comprising the information processing apparatus according to any of Items 1-6.

According to this item, the accuracy of the inference operation of the vehicle is improved.

Item 8. The vehicle according to Item 7, further comprising
a detection unit (41-43) configured to acquire external data related to an external of the vehicle, wherein
the processing unit is configured to acquire the external data as constituting data of the time series data.

According to this item, the accuracy of the inference operation using the external data is improved.

Item 9. The vehicle according to Item 8, wherein the detection unit is configured to acquire the external data in the execution cycle.

According to this item, the external data can be acquired in synchronization with the inference operation.

Item 10. The vehicle according to any of Items 7-9, further comprising a travelling control unit (20) configured to control travelling of the vehicle based on a result of the inference operation.

According to this item, the quality of travelling control is improved.

Item 11. An information processing apparatus (500) comprising
a processing unit (501) configured to input input data including time series data to a neural network (300, 800) to cause the neural network to perform learning, wherein an interval of acquiring constituting data of the time series data is longer than an execution cycle of an inference operation performed using the neural network.

According to this item, the change in the time series data can be easily recognized, so that the accuracy of the inference operation is improved.

Item 12. The information processing apparatus according to Item 11, wherein an interval of acquiring constituting data of the time series data is a two or more integral multiple of the execution cycle of the inference operation performed using the neural network.

According to this item, the acquisition cycle of the constituting data and the execution cycle of the inference operation can be synchronized, so that calculation is easy.

Item 13. The information processing apparatus according to Item 11 or 12, wherein the neural network is a recurrent neural network, and the processing unit is configured to feed back, to a second intermediate layer of the recurrent neural network, an output of a first intermediate layer at a time earlier by a two or more integral multiple of the execution cycle.

According to this item, the accuracy of the inference operation is further improved.

Item 14. The information processing apparatus according to Item 12, wherein the neural network is a three-dimensional convolutional neural network.

According to this item, the accuracy of the inference operation is further improved.

Item 15. A non-transitory storage medium comprising a program for causing a computer to function as each unit of the information processing apparatus according to any of Items 1-6 and 11-12.

According to this item, the invention is implemented in a form of a program.

The invention is not limited to the foregoing embodiments, and various variations/changes are possible within the spirit of the invention.

What is claimed is:

1. An information processing apparatus comprising
a processing unit configured to execute an inference operation in an execution cycle, wherein
the inference operation is executed by inputting input data including time series data to a neural network, and
an interval between each adjacent pair of constituting data of the time series data to be input in a single time of the inference operation is longer than the execution cycle.

2. The information processing apparatus according to claim 1, wherein an interval of acquiring constituting data of the time series data to be input in a single time of the inference operation is a two or more integral multiple of the execution cycle.

3. The information processing apparatus according to claim 1, wherein the processing unit is configured to update, for each execution of the inference operation, the time series data included in the input data to include constituting data acquired at a new time.

4. The information processing apparatus according to claim 1, wherein the processing unit is configured to update, for each execution of the inference operation, the time series data included in the input data, wherein each constituting data of the updated time series data is constituting data acquired at a time advanced by the execution cycle.

5. The information processing apparatus according to claim 1, wherein
the neural network is a recurrent neural network, and
the processing unit is configured to feed back, to a second intermediate layer of the recurrent neural network, an output of a first intermediate layer at a time earlier by a two or more integral multiple of the execution cycle.

6. The information processing apparatus according to claim 1, wherein the neural network is a three-dimensional convolutional neural network.

7. A vehicle comprising the information processing apparatus according to claim 1.

8. The vehicle according to claim 7, further comprising
a detection unit configured to acquire external data related to an external of the vehicle, wherein
the processing unit is configured to acquire the external data as constituting data of the time series data.

9. The vehicle according to claim 8, wherein the detection unit is configured to acquire the external data in the execution cycle.

10. The vehicle according to claim 7, further comprising a travelling control unit configured to control travelling of the vehicle based on a result of the inference operation.

11. A non-transitory storage medium comprising a program for causing a computer to function as each unit of the information processing apparatus according to claim 1.

12. An information processing apparatus comprising
a processing unit configured to input input data including time series data to a neural network to cause the neural network to perform learning, wherein
an interval between each adjacent pair of constituting data of the time series data is longer than an execution cycle of an inference operation performed using the neural network.

13. The information processing apparatus according to claim 12, wherein an interval of acquiring constituting data of the time series data is a two or more integral multiple of the execution cycle of the inference operation performed using the neural network.

14. The information processing apparatus according to claim 12, wherein
the neural network is a recurrent neural network, and
the processing unit is configured to feed back, to a second intermediate layer of the recurrent neural network, an output of a first intermediate layer at a time earlier by a two or more integral multiple of the execution cycle.

15. The information processing apparatus according to claim 12, wherein the neural network is a three-dimensional convolutional neural network.

16. A non-transitory storage medium comprising a program for causing a computer to function as each unit of the information processing apparatus according to claim 12.

* * * * *